US011044035B2

(12) United States Patent
Grammel et al.

(10) Patent No.: US 11,044,035 B2
(45) Date of Patent: *Jun. 22, 2021

(54) APPARATUS, SYSTEMS, AND METHODS FOR OPTICAL CHANNEL MANAGEMENT

(71) Applicant: Juniper Networks, Inc., Sunnyvale, CA (US)

(72) Inventors: Gert Grammel, Ditzingen (DE); Ajay Kachrani, Nashua, NH (US); Patrick Michael McEachern, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,102

(22) Filed: Mar. 31, 2020

(65) Prior Publication Data

US 2020/0235839 A1 Jul. 23, 2020

Related U.S. Application Data

(63) Continuation of application No. 15/639,247, filed on Jun. 30, 2017, now Pat. No. 10,615,901.

(51) Int. Cl.
*H04J 14/02* (2006.01)
*H04L 12/721* (2013.01)
(Continued)

(52) U.S. Cl.
CPC ...... *H04J 14/0212* (2013.01); *H04B 10/0773* (2013.01); *H04B 10/07955* (2013.01);
(Continued)

(58) Field of Classification Search
CPC .... H04J 14/02; H04J 14/0212; H04J 14/0227; H04J 14/021; H04J 14/0217;
(Continued)

(56) References Cited

U.S. PATENT DOCUMENTS

| 6,728,484 B1 | 4/2004 | Ghani |
| 8,509,621 B2 * | 8/2013 | Boertjes .............. H04J 14/0212 398/83 |

(Continued)

FOREIGN PATENT DOCUMENTS

| CN | 101106424 | 1/2008 |
| CN | 101672954 | 3/2010 |

(Continued)

OTHER PUBLICATIONS

Extended European Search Report for European Application No. 18180666.2, dated Nov. 16, 2018, 10 pages.

(Continued)

*Primary Examiner* — Hanh Phan
(74) *Attorney, Agent, or Firm* — Cooley LLP

(57) ABSTRACT

An apparatus includes a reconfigurable optical add/drop multiplexer (ROADM) having an input port to receive a first optical signal from a second device. The ROADM also includes a first wavelength selective switch (WSS), in optical communication with the input port, to convert the first optical signal into a second optical signal, a loopback, in optical communication with the first WSS, to transmit the second optical signal, and a second WSS, in optical communication with the loopback, to convert the second optical signal to a third optical signal and direct the third optical signal back to the second device via the input port.

20 Claims, 11 Drawing Sheets

(51) Int. Cl.
*H04Q 11/00* (2006.01)
*H04B 10/079* (2013.01)
*H04B 10/077* (2013.01)

(52) U.S. Cl.
CPC .... *H04B 10/07957* (2013.01); *H04J 14/0204* (2013.01); *H04J 14/0205* (2013.01); *H04J 14/0216* (2013.01); *H04J 14/0221* (2013.01); *H04J 14/0269* (2013.01); *H04J 14/0275* (2013.01); *H04L 45/34* (2013.01); *H04Q 11/0005* (2013.01); *H04Q 11/0066* (2013.01); *H04J 2203/0032* (2013.01); *H04Q 2011/009* (2013.01); *H04Q 2011/0016* (2013.01); *H04Q 2011/0083* (2013.01)

(58) Field of Classification Search
CPC ........ H04B 10/07955; H04B 10/07957; H04Q 11/0066; H04Q 11/0005
USPC ........ 398/83, 79, 45, 48, 49, 33, 38, 37, 16, 398/59, 25, 10, 13, 17, 32, 30, 31; 385/24, 37, 16, 17, 18
See application file for complete search history.

(56) References Cited

U.S. PATENT DOCUMENTS

| | | | |
|---|---|---|---|
| 8,861,968 | B2 | 10/2014 | Zhang et al. |
| 8,948,005 | B1 | 2/2015 | Gert |
| 9,692,544 | B2 | 6/2017 | Wellbrock et al. |
| 9,698,902 | B2 * | 7/2017 | Nakamura ......... H04B 10/0775 |
| 10,615,901 | B2 * | 4/2020 | Grammel ......... H04B 10/07955 |
| 2005/0025489 | A1 | 2/2005 | Aldridge et al. |
| 2008/0260383 | A1 | 10/2008 | Zhong et al. |
| 2011/0262142 | A1 | 10/2011 | Archambault |
| 2013/0136447 | A1 | 5/2013 | Cavaliere et al. |
| 2013/0259474 | A1 | 10/2013 | Ji et al. |
| 2014/0355984 | A1 | 12/2014 | Yuan |
| 2015/0071633 | A1 | 3/2015 | Mehrvar et al. |
| 2015/0381272 | A1 | 12/2015 | Nakamura et al. |
| 2016/0099851 | A1 | 4/2016 | Archambault et al. |
| 2016/0315701 | A1 | 10/2016 | Yuki et al. |
| 2016/0365921 | A1 | 12/2016 | Costantini et al. |

FOREIGN PATENT DOCUMENTS

| | | |
|---|---|---|
| CN | 105229945 | 1/2016 |
| EP | 2564531 | 12/2013 |
| EP | 2465217 | 12/2016 |
| WO | WO 2014/153451 | 9/2014 |

OTHER PUBLICATIONS

Office Action for Chinese Application No. 201810695688.8, dated Sep. 12, 2019, 10 pages.

\* cited by examiner

APPARATUS, SYSTEMS, AND METHODS FOR OPTICAL CHANNEL MANAGEMENT

CROSS-REFERENCE TO RELATED APPLICATION

This application is a continuation of U.S. patent application Ser. No. 15/639,247, now U.S. Pat. No. 10,615,901, filed Jun. 30, 2017, and entitled "Apparatus, Systems, and Methods for Optical Channel Management", the disclosure of which is incorporated herein by reference in its entirety.

FIELD

One or more embodiments relate to apparatus, systems, and methods of optical channel management.

BACKGROUND

In some instances, it may be important for a network administrator to determine the topology an optical network. For example, it may be helpful for the network administrator to determine that an optical fiber connects a given port of one device in the optical network to a given port of another device in the optical network. Knowledge of the topology of the optical network may be helpful when establishing routes through the optical network, diagnosing and remedying problems in the optical network, and performing other manual or automated network management tasks.

For example, an optical network may include a router, a multiplexer/demultiplexer (Mux/Demux), and a reconfigurable optical add-drop multiplexer (ROADM). The connections of these devices can involve about 400 touch points for 100 different wavelengths. In known optical networks, the access link is manually provisioned. In addition, in case of misconnection or misconfiguration, usually no mechanism exists to identify the root cause. Moreover, routers and ROADMs typically use different command line interface (CLI) dialects, thereby rendering the correlation of relevant information challenging.

Another approach to determine the topologies of optical networks uses a device sending wavelength-modulated optical signals on various ports of the device. The wavelength-modulated optical signal sent on a given port of the sending device is encoded with identification information specific to the given port. If a device receives the modulated optical signal on a given port, the receiving device demodulates the optical signal and outputs a report message to a network management system (NMS). The report message indicates the source of the received signal. The NMS may use such messages to generate topology data for the optical network. A problem with this approach is that the receiving device includes hardware to demodulate the optical signal and such hardware may be complex and expensive, thereby increasing the cost of the resulting optical network.

SUMMARY

Some embodiments described herein relate generally to optical channel management, and, in particular, to optical channel management using reconfigurable optical add/drop multiplexers (ROADM) with loopback functions.

In some embodiments, an apparatus includes a reconfigurable optical add/drop multiplexer (ROADM) having an input port to receive a first optical signal from a second device. The ROADM also includes (1) a first wavelength selective switch (WSS), in optical communication with the input port, to convert the first optical signal into a second optical signal; (2) a loopback, in optical communication with the first WSS, to transmit the second optical signal; and (3) a second WSS, in optical communication with the loopback, to convert the second optical signal to a third optical signal and direct the third optical signal back to the second device via the input port.

In some embodiments, a method includes receiving a first optical signal from a second device via an input port of a reconfigurable optical add/drop multiplexer (ROADM). The method also includes transmitting the first optical signal to a first wavelength selective switch (WSS) to convert the first optical signal into a second optical signal and transmitting the second optical signal to a second WSS, in optical communication with the input port, to convert the second optical signal to a third optical signal. The method also includes transmitting the third optical signal towards the second device via the input port.

In some embodiments, a reconfigurable optical add/drop multiplexer (ROADM) includes an input port to receive a first optical signal from a second device and a first wavelength selective switch (WSS), in optical communication with the input port, to convert the first optical signal into a second optical signal. The ROADM also includes a first spectral analyzer, operatively coupled to the input port, to acquire first spectral information of the first optical signal. An optical transmission line is in optical communication with the first WSS to transmit the second optical signal towards the second device. The ROADM also includes at least one user port, operatively coupled to the first WSS, to receive at least a portion of the second optical signal. A second spectral analyzer is operatively coupled to the at least one user port to acquire second spectral information of the second optical signal. The ROADM further includes an optical channel monitor (OCM) operatively coupled to the first spectral analyzer and the second spectral analyzer. The OCM is configured to receive the first spectral information so as to locate the at least one user port, receive the second spectral information from the second spectral analyzer, and transmit the second spectral information to the second device.

DETAILED DESCRIPTION

In some embodiments, an apparatus includes a reconfigurable optical add/drop multiplexer (ROADM), which in turn includes (1) an input port to receive a first optical signal from a second device and (2) a first wavelength selective switch (WSS), in optical communication with the input port, to convert the first optical signal into a second optical signal. A loopback is included in the ROADM and in optical communication with the first WSS to transmit the second optical signal to a second WSS. The second WSS converts the second optical signal to a third optical signal and directs the third optical signal back to the second device via the input port.

In some embodiments, the ROADM is implemented in an optical network including a router and a Mux/Demux to receive optical signals from the router via the Mux/Demux. The ROADM is also configured to transmit optical signals to the router via the Mux/Demux. The loopback in the ROADM allows a test of the optical path between the router and the ROADM in both directions prior to putting the link into service. This can be useful for the execution of a discovery method. Typical state-of-the-art ROADMs only passively pass through optical signals and measure their power, without the ability to actively transmit light. With the loopback, the ROADM disclosed herein transmit a portion of the received light back to the router to complete the discovery process and measure the quality.

In addition, known methods in optical channel management may discover the transmitter-ROADM direction, assuming that the reverse direction (i.e. ROADM-transmitter direction) would work. As a result, a received optical signal having a bad quality may be caused by a bad patch cable miles away from the location of installation. Upon introducing the loopback capability into the discovery phase, a quality test can be implemented to ensure that after a successful discovery, the location where transmitter (e.g., on the router) and ROADM are connected is operational. The same procedure can be implemented at the remote end, after which wavelengths can be set up automatically with high confidence about the optical signal quality.

Figure 1:
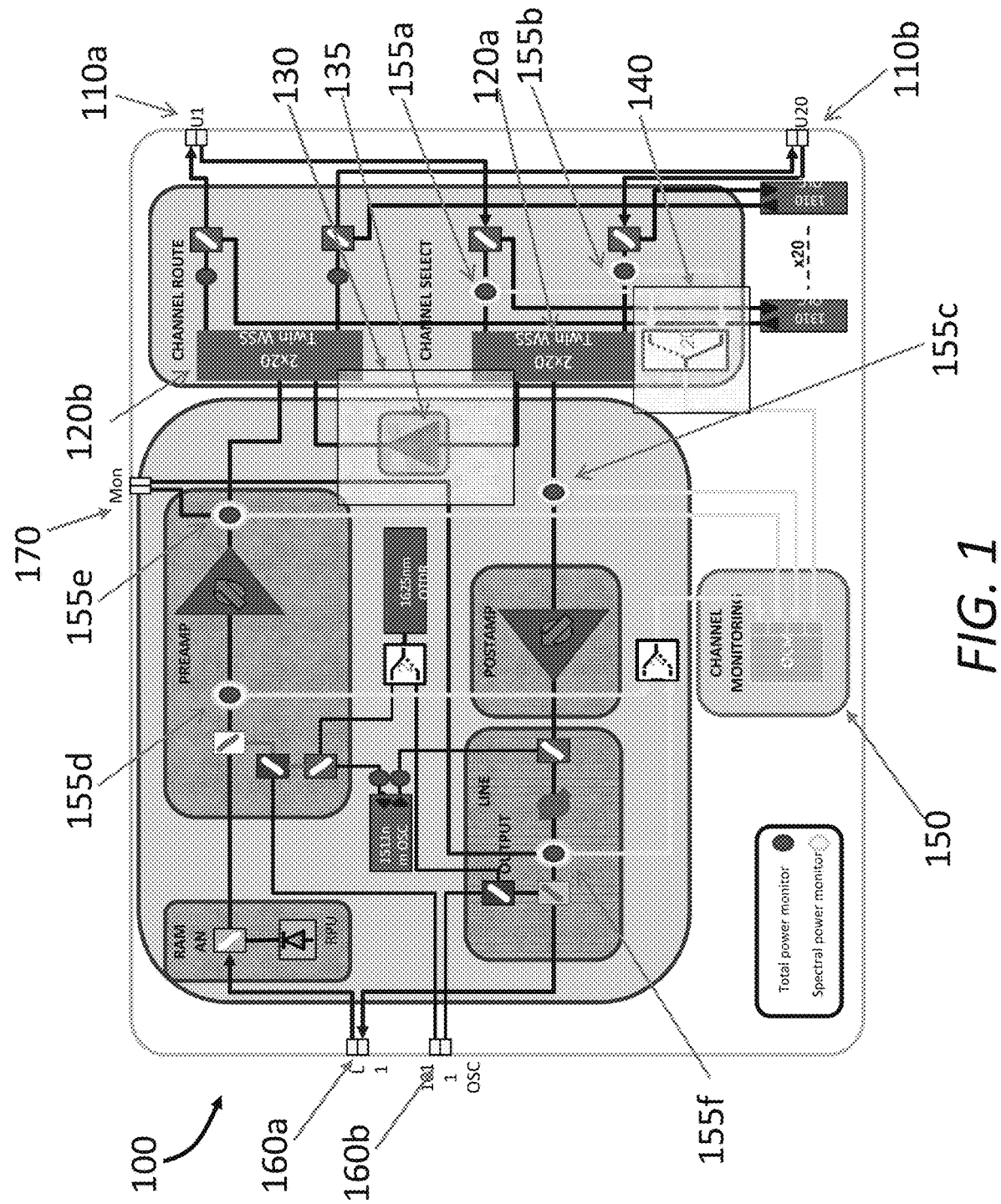
FIG. 1 shows a schematic of an apparatus with loopback capability for optical channel management, according to some embodiments.

FIG. 1 shows a schematic of an apparatus 100 for optical channel management according to an embodiment. The apparatus 100 is usually configured as a ROADM and includes a two input ports 110$a$ and 110$b$ to receive an input signal (referred to as a first optical signal) from another device (also referred to herein as a "second device"), such as a router or a Mux/Demux (see, e.g., FIG. 3). Using the input port 110$a$ as an example, the input signal received by this input port 110$a$ is transmitted to a first wavelength selective switch (WSS) 120$a$ to generate a second optical signal. A loopback 130 is in optical communication with the first WSS 120$a$ to receive the second optical signal and sends (or loopbacks) the second optical signal to a second WSS 120$b$.

The transmission through the second WSS 120$b$ generates a third optical signal and directs the third optical signal back to the second device via the input port 110$a$. The third optical signal can be used for optical channel management, such as channel discovery and channel provisioning.

As used herein, the terms "first," "second," and "third" are used to denote differences in the respective signal. The differences may include the location of the respective signal. For example, the second optical signal refers to the optical signal after the first WSS 120$a$, and the third optical signal refers to the optical signal after the second WSS 120$b$. The differences may also include the order in which these signals are discussed and/or recited in the claims. In addition, the term "generates" as used herein includes the action of redirection, amplification, and/or transmission. For example, the second optical signal can be generated via the transmission of the first optical signal through the first WSS 120$a$, and the third optical signal can be generated via the transmission of the second optical signal through the second WSS 120$b$. Accordingly, in some implementations, the first optical signal can be substantially identical to the second optical signal. In some implementations, the third optical signal can be substantially identical to the second optical signal. In some implementations, the third optical signal can be the second optical signal after amplification.

Similarly, the second input port 110$b$ can also receive an input signal and transmit the input signal through the first WSS 120$a$, the loopback 130, and the second WSS 120$b$. The optical signal after the second WSS 120$b$ is directed back to the second input port 110$b$, which transmits the optical signal back to the second device.

FIG. 1 shows two input ports 110$a$ and 110$b$ in the apparatus 100 for illustrative purposes. In practice, the apparatus 100 can include any other number of input ports (e.g., 3 input ports, 5 input ports, 10 input ports, or more, including any values and sub ranges in between). Similarly, the apparatus 100 can also include any other number of WSS (e.g., 3 WSS, 5 WSS, 10 WSS, or more, including any values and sub ranges in between). In some embodiments, the two input ports 110$a$ and 110$b$ share the same pair of WSS 120$a$ and 120$b$, as shown in FIG. 1. In some other embodiments, each of the input ports can have its own pair of WSSs.

In some implementations, the loopback 130 includes an optical waveguide, such as a fiber or a semiconductor waveguide. As shown in FIG. 1, the loopback 130 further includes an amplifier 135 to amplify the second optical signal so as to increase the signal amplitude transmitted back to the second device. For example, the amplifier 135 can include an erbium-doped fiber amplifier for optical amplification.

The apparatus 100 also includes two spectral analyzers 155$a$ and 155$b$ (collectively referred to as spectral analyzers 155) to facilitate estimation of spectral information of input signals received by the first input port 110$a$ and the second input port 110$b$, respectively. The spectral analyzers 155 are also referred to as fiber tap-off, couplers, or splitters, and they couple a portion of the input signals to an optical channel monitor (OCM) 150 via an optical switch 140. The OCM 150 can estimate the spectral information (e.g., wavelength and/or spectral density) of the input signals.

Part of the second optical signal (also referred to as drop signal) generated by the first WSS 120$a$ is transmitted to a user port 160$a$. The apparatus 100 also includes a second user port 160$b$, where information about the summary of wavelength is transmitted to a fiber or received from a fiber. FIG. 1 shows that a fiber pair is connected to the port 160$b$, where the upper one can be a receiving fiber and the lower one can be a transmitting fiber.

A third spectral analyzer 155c is disposed within the beam path of the second optical signal to couple a portion of the second optical signal to the OCM 150 for spectral analysis. The user port 160a is also configured to add optical signals (also referred to as "add signals") back to the second device. In this case, a fourth spectral analyzer 155d is disposed within the beam path to couple a portion of the add signals to the OCM 150 for spectral analysis. In addition, part of the add signals and drop signals are transmitted to a monitoring port 170. Two additional spectral analyzers 155e and 155f are employed to split part of the add signals and the drop signals (after a pre-amplifier and a post-amplifier, respectively) to the OCM 150 for spectral analysis.

The spectral information acquired or identified by the OCM 150 can be used for several functions. In one implementation, the apparatus 100 includes multiple user ports 160, each of which is configured to deliver optical signals having a distinct wavelength. Based on the spectral information of the second optical signal, the OCT 150 can determine the location of the user port that receives the second optical signal (i.e. location of the user port).

In some other implementations, the apparatus 100 includes multiple user ports 160, where one of them is configured to receive the second optical signal and the remaining users ports 160 do not receive the second signal. Each user port 160 is coupled to a respective spectral analyzer 155 to facilitate estimation of spectral information of possible signals that may be transmitted to the given user port 160. The OCM 150 in this case can first estimate the signal power of the possible signals to each user port 160. In the event that one user port 160 has a signal power greater than a threshold value, the OCM 150 then estimates the spectral information of the signals that are transmitted to that user port and locate the user port based on the spectral information. This approach may reduce the power consumption for computation because it typically takes less computation power to estimate the signal powers than to estimate the signal spectrum.

In some embodiments, part or all of the spectral information acquired or identified by the OCM 150 is transmitted back to the second device (e.g., a router). Based on the received spectral information, the second device can determine whether the second device is correctly coupled to the apparatus.

Figure 2:
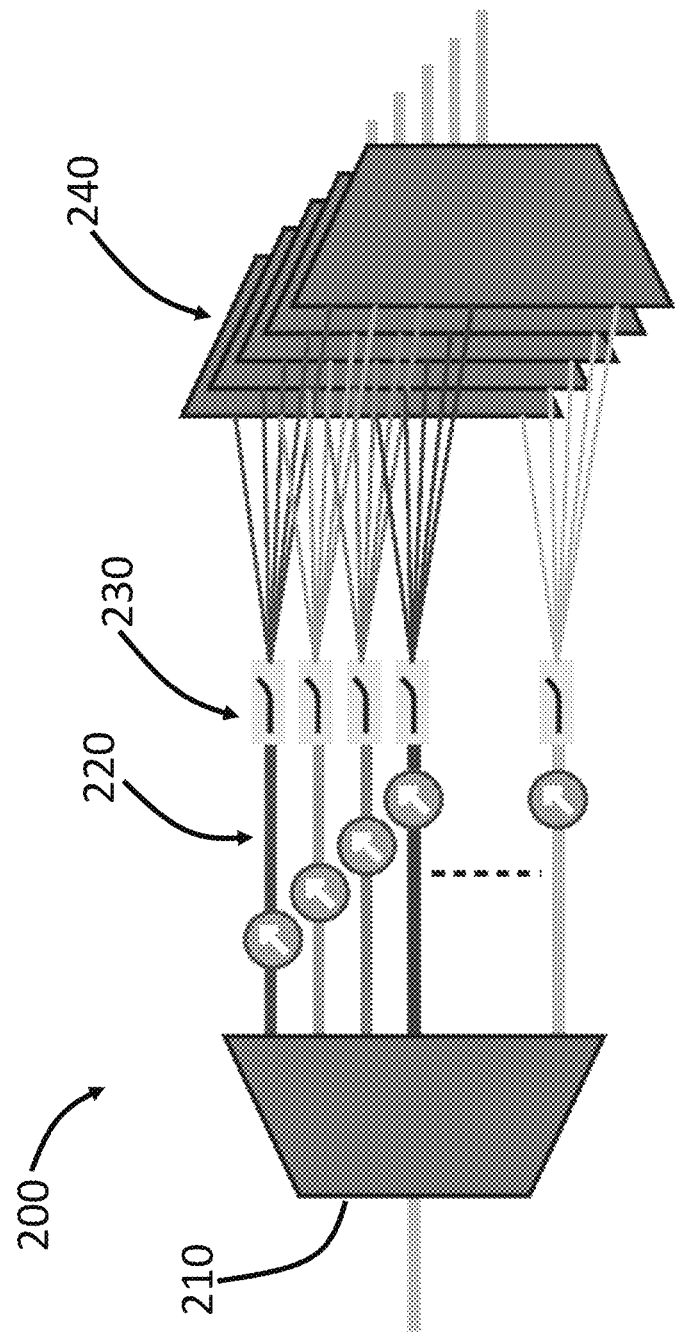
FIG. 2 shows a schematic of a wavelength selective switch (WSS) that can be used in the apparatus shown in FIG. 1, according to embodiments.

FIG. 2 shows a schematic of a WSS 200 that can be used in the ROADM 100 shown in FIG. 1. The WSS 200 includes an input port 210 to receive an input signal (e.g., from an input fiber) and split the input signal into multiple spectral components 220, each of which has a distinct wavelength (or a distinct spectral component). Each spectral component 220 is received by a corresponding optical switch 230, which can direct the given spectral component 220 to any of the output ports 240. Each output port 240 can be coupled to a corresponding output fiber to deliver the spectral component.

In some implementations, the WSS 200 can employ Micro Electro Mechanical Systems (MEMS) technologies to constructs movable micro-mirrors (i.e., the optical switches 230) that can deflect optical signals from input to output fibers. As far as medium- and large-size switching fabrics are concerned, micro-mirrors can be arranged into two-dimensional or three-dimensional arrays.

In some implementations, the WSS 200 can use liquid crystal to construct the optical switches 230. For example, in a 1×2 optical switch, a polarizing beam splitter can be used to divide input signals into two polarization components, which are then directed to two active cells filled with liquid crystals. Depending on whether a driving voltage is applied or not, the active cells either change the polarization states of the incident beams or leave them unaltered. A beam combiner can be used to direct the beam to the desired output port. These switches are wavelength selective, i.e. they can switch signals depending on their wavelength. This is a very attractive feature as it allows adding and dropping single wavelengths from a multi-wavelength beam, without the need of electronically processing the whole signal.

In some implementations, the WSS 200 can be based on the thermo-optic effect. Two categories of thermo-optic switches include interferometric and digital optical switches. In some embodiments, the WSS 200 uses interferometric switches, which are usually based on Mach-Zender interferometers. These switches 230 can include a first coupler that splits the input signal into two beams, which then travel through two distinct arms having the same length. A second coupler merges or combines the two signals from the two arms and splits the signal again. Heating one arm of the interferometer causes its refractive index to change, thereby producing a variation of the optical path of that arm and accordingly a phase difference between the two signals propagating in the two arms. As interference of the two signals alternate between constructive interference and destructive interference, the power on alternate outputs can be minimized or maximized, thereby selecting the output port.

In some implementations, the WSS 200 can use digital optical switches, which are integrated optical devices made of silica on silicon. The digital optical switch includes two interacting waveguide arms through which light propagates. The phase error between the beams at the two arms can determine the output port. Heating one of the arms changes its refractive index, and the light is transmitted down one path rather than the other.

In some implementations, the WSS 200 use electro-holography, which is a beam-deflection method based on controlling the reconstruction process of volume holograms by means of an electric field. Holograms are stored as a spatial distribution of charge in crystals. The application of a driving voltage is used to activate pre-stored holograms in order to deflect properly light beams. In both states of the switch, the output beams are diffracted beams. If there is no voltage applied, the crystal is transparent to optical signals and pass the optical signals. If a suitable driving voltage is applied, the optical signals crossing the crystal are deflected. As it is possible to store several holograms in the same crystal, these devices can be used to drop even single wavelengths, or groups of wavelengths, from a WDM signal.

Figure 3A:
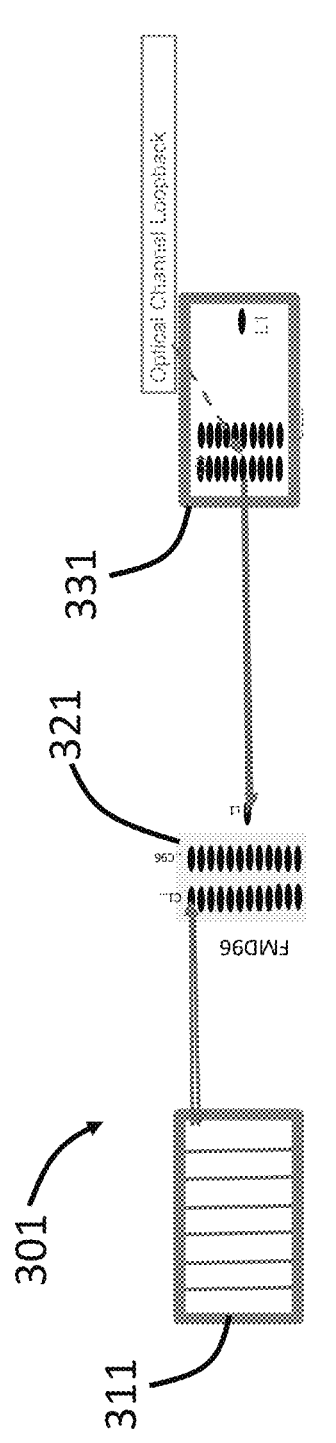
FIG. 3A shows a schematic of an optical network using a fixed-color Mux/Demux and the apparatus shown in FIG. 1 for optical channel management, according to embodiments.

FIG. 3 FIG. 3A shows a schematic of an optical network 301 including a fixed-color Mux/Demux 321 and a ROADM 331. The ROADM 331 can be, for example, similar to the ROADM discussed above in reference to FIG. 1. The Mux/Demux 321 receives optical signals from a router 311 and transmits the received optical signals to the ROADM 331. The ROADM 331 has loopback capability as described to re-direct part of the received optical signals back to the router 311, if the router 311, the Mux/Demux 321, and the ROADM 331 are connected correctly, following the same beam path as the incident optical signals. In the fixed-color Mux/Demux 321, each output port (e.g., for de-multiplexed signals) is configured to deliver a spectral component having a given wavelength and but not other wavelengths.

Figure 3B:
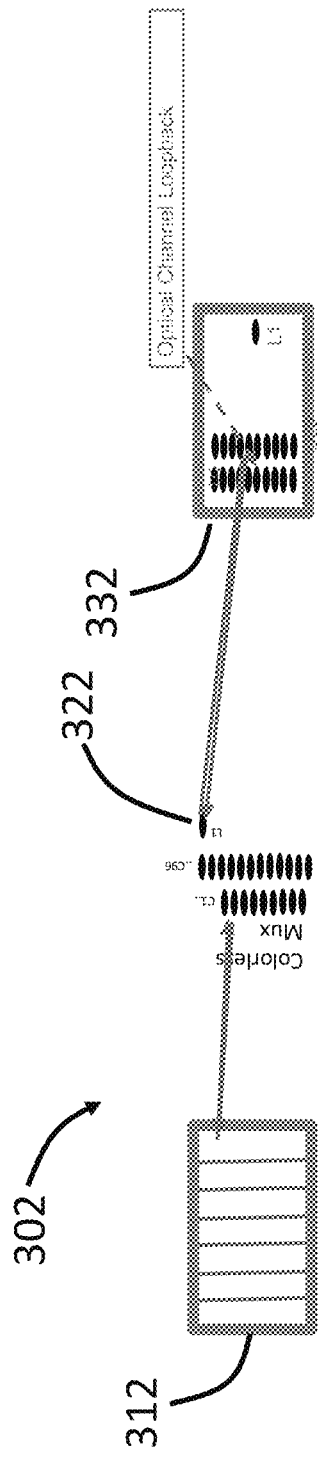
FIG. 3B shows a schematic of an optical network using a colorless Mux/Demux and the apparatus shown in FIG. 1 for optical channel management, according to embodiments.

FIG. 3B shows a schematic of an optical network 302 using a colorless Mux/Demux 322 and a ROADM 332. The ROADM 331 can be, for example, similar to the ROADM discussed above in reference to FIG. 1. The Mux/Demux 322 receives optical signals from a router 312 and transmits the received optical signals to the ROADM 332. The ROADM 332 has loopback capability as described to redirect part of the received optical signals back to the router 312.

In some implementations, the colorless Mux/Demux 322 can include a cyclic arrayed waveguide grating (AWG), which can operate as a static wavelength router. A cyclic AWG can include a set of input ports and a set of output ports. For example, an N×N cyclic AWG includes N input ports and N output ports. When a comb of N Wavelengths is applied at one input port (e.g., a first input port), the wavelengths in the comb are split so that each wavelength of the comb is present at a corresponding output port. If the same wavelength comb is applied to a different input port (e.g., a second input port), the wavelengths are split again among the output ports, but in a different order. This can ensure that no output port experiences a collision of equal wavelengths coming from different input ports.

Operation of a cyclic AWG

|  |  | AWG Input Port | | | | | | | | | |
|---|---|---|---|---|---|---|---|---|---|---|---|
|  |  | 1 | 2 | 3 | 4 | 5 | 6 | 7 | 8 | 9 | 10 |
| AWG Output Port | 1 | λ1 | λ2 | λ3 | λ4 | λ5 | λ6 | λ7 | λ8 | λ9 | λ10 |
|  | 2 | λ2 | λ3 | λ4 | λ5 | λ6 | λ7 | λ8 | λ9 | λ10 | λ1 |
|  | 3 | λ3 | λ4 | λ5 | λ6 | λ7 | λ8 | λ9 | λ10 | λ1 | λ2 |
|  | 4 | λ4 | λ5 | λ6 | λ7 | λ8 | λ9 | λ10 | λ1 | λ2 | λ3 |
|  | 5 | λ5 | λ6 | λ7 | λ8 | λ9 | λ10 | λ1 | λ2 | λ3 | λ4 |
|  | 6 | λ6 | λ7 | λ8 | λ9 | λ10 | λ1 | λ2 | λ3 | λ4 | λ5 |
|  | 7 | λ7 | λ8 | λ9 | λ10 | λ1 | λ2 | λ3 | λ4 | λ5 | λ6 |
|  | 8 | λ8 | λ9 | λ10 | λ1 | λ2 | λ3 | λ4 | λ5 | λ6 | λ7 |
|  | 9 | λ9 | λ10 | λ1 | λ2 | λ3 | λ4 | λ5 | λ6 | λ7 | λ8 |
|  | 10 | λ10 | λ1 | λ2 | λ3 | λ4 | λ5 | λ6 | λ7 | λ8 | λ9 |

Table 1 above gives an example for a 10 channel AWG. In practice, the cyclic AWGs can support 40 channels or more. In this example, the wavelength comb includes 10 spectral components λ1 to λ10. If the wavelength comb is delivered to the first input port, the output wavelengths at the ten output ports are following the order λ1, λ2, . . . , to λ10. If the same wavelength comb is delivered to the second input port, the output wavelengths at the ten output ports are then following the order, λ2, λ3, . . . , λ10 and λ1. The orders of the output wavelengths when the wavelength comb is delivered into other input ports can be similarly found in Table 1 below.

Figure 4:
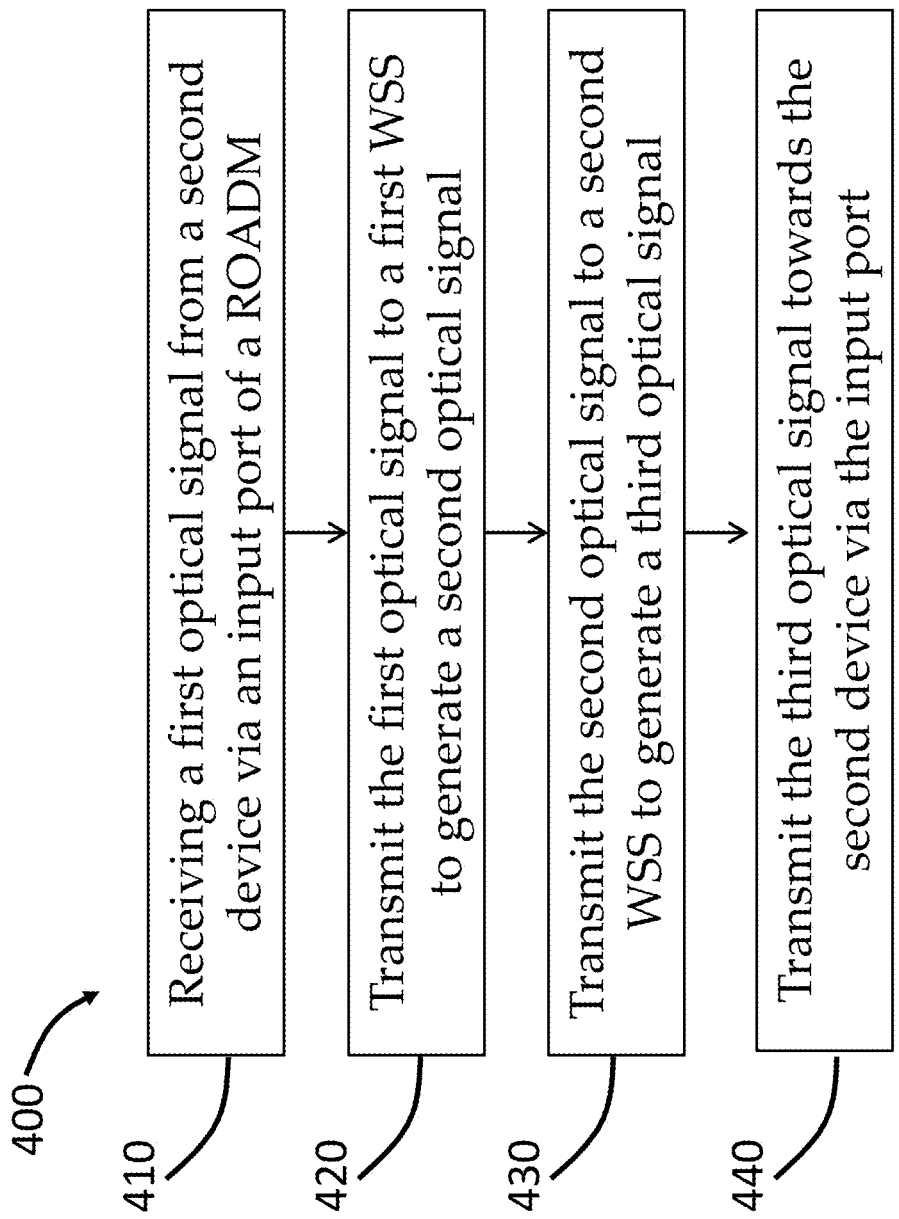
FIG. 4 illustrates a method of optical channel management using a reconfigurable optical add/drop multiplexer (ROADM) with loopback capability, according to embodiments.

FIG. 4 illustrates a method 400 of optical channel management using a ROADM with loopback capabilities, according to an embodiment. The method 400 includes, at 410, receiving a first optical signal from a second device via an input port of a reconfigurable optical add/drop multiplexer (ROADM). At 420, the first optical signal is transmitted to a first wavelength selective switch (WSS), which converts the first optical signal into a second optical signal. At 430, the second optical signal is transmitted to a second WSS, which converts the second optical signal to a third optical signal. As used herein, the term "convert" may include, for example, actions of shaping the optical signals, switching the optical signals to a certain propagation direction, and/or amplifying the optical signals to a defined level. In some implementations, the second optical signal can be substantially identical to the first optical signal (except, for example, the propagation direction). In some implementations, the third optical signal can be substantially identical to the second optical signal.

The method 400 further includes, at 440, transmitting the third optical signal towards the second device via the input port. The second device can use the received third optical signal (or the absence of any third optical signal) to evaluate the optical connection between the second device and the ROADM.

In some implementations, the second device includes a router. In some instances, the second device can deliver the optical signals to the ROADM via an intermediary device, such as a switch or a Mux/Demux.

In some implementations, the method 400 further includes amplifying the second optical signal before transmitting the second optical signal to the second WSS. In some embodiments, the second optical signal can be amplified by an erbium doped fiber amplifier. In some embodiments, the second optical signal can be amplified by any other appropriate amplifiers.

In some implementations, the method 400 further includes acquiring spectral information of the first optical signal. The spectral information can be used to locate the user port that is configured to receive the second optical signal. In these cases, the second optical signal and the spectral information can be sent back to the second device for optical channel management.

In some implementations, the method 400 further includes acquiring first spectral information of the first optical signal and transmitting a portion of the second optical signal to at least one user port. The location of the user port receiving the second optical signal is then determined by the first spectral information. The spectral information of the second optical signal (referred to as the second spectral information) is also acquired. The method 400 further includes provisioning an optical channel on the user port based at least in part on the first spectral information and the second spectral information. The spectral information in these implementations can be acquired by, directing part of the first optical signal and the second optical signal to an optical channel monitor (OCM).

In some implementations, the method further includes generating a status representing connection between the second device and the input port based at least in part on the third optical signal or the absence of the third optical signal. For example, if no signal is received by the second device, then the second device can determine that the second device is incorrectly connected to the ROADM or not connected to the ROADM at all. If some signal is received but at the wrong wavelength, then the second device can determine that the cabling between the second device and the ROADM is incorrect. If some signal at the correct wavelength is received but the signal level is low, then the second device can determine that the contact between the second device and the ROADM may be compromised by, for example, dust or other contamination.

In some implementations, the method 400 further includes acquiring first spectral information of the first optical signal and transmitting a portion of the second optical signal to at least one user port in a set of multiple user ports. The second spectral information transmitted to each user port is acquired. The method 400 further includes locating the user port that receives the second optical signal based at least in part on the first spectral information and the second spectral information.

In some implementations, the method 400 further includes acquiring first spectral information of the first optical signal and transmitting a portion of the second optical signal to at least one user port in a set of multiple user ports of the ROADM. The power at each user port is then detected. In response to detection of optical power at some user ports, the method 400 further includes acquiring respective second spectral information transmitted to each user port in those user ports where optical power is detected. The user port that receives the second optical signal is the located (or identified) based at least in part on the first spectral information and the second spectral information.

In some implementations, the first optical signal includes multiple first test signals output from a colored multiplexer/demultiplexer. Each first test signal has a distinct wavelength. The method further includes transmitting the first test signals to the first WSS to convert the first test signal into second test signals. At least one of the second test signals is transmitted to a user port. The method further includes receiving at least some of the second test signals at the second device and locating (or identifying) at least one optical path between the second device and the user port. The location can be based on the spectral information of the second test signals received at the second device.

In some implementations, the first optical signal includes a first output signal from a colorless multiplexer/demultiplexer, and the method further includes transmitting the first output signal to the first WSS to convert the output signal into a second output signal. At least a portion of the second output signal is transmitted to a user port. Using the loopback capability of the ROADM, at least a portion of the second output signal is sent back towards the second device. At least one optical path between the second device and the user port is then determined (or identified) based on the portion of the second output signal (or the absence of any second output signal) received at the second device.

In some implementations, the method 400 further includes setting a timer with a predetermined expiration time. In response to no signal received by the router within the predetermined expiration time, the method 400 includes generating an error message representing an erroneous connection between the second device and the input port.

Figure 5A:
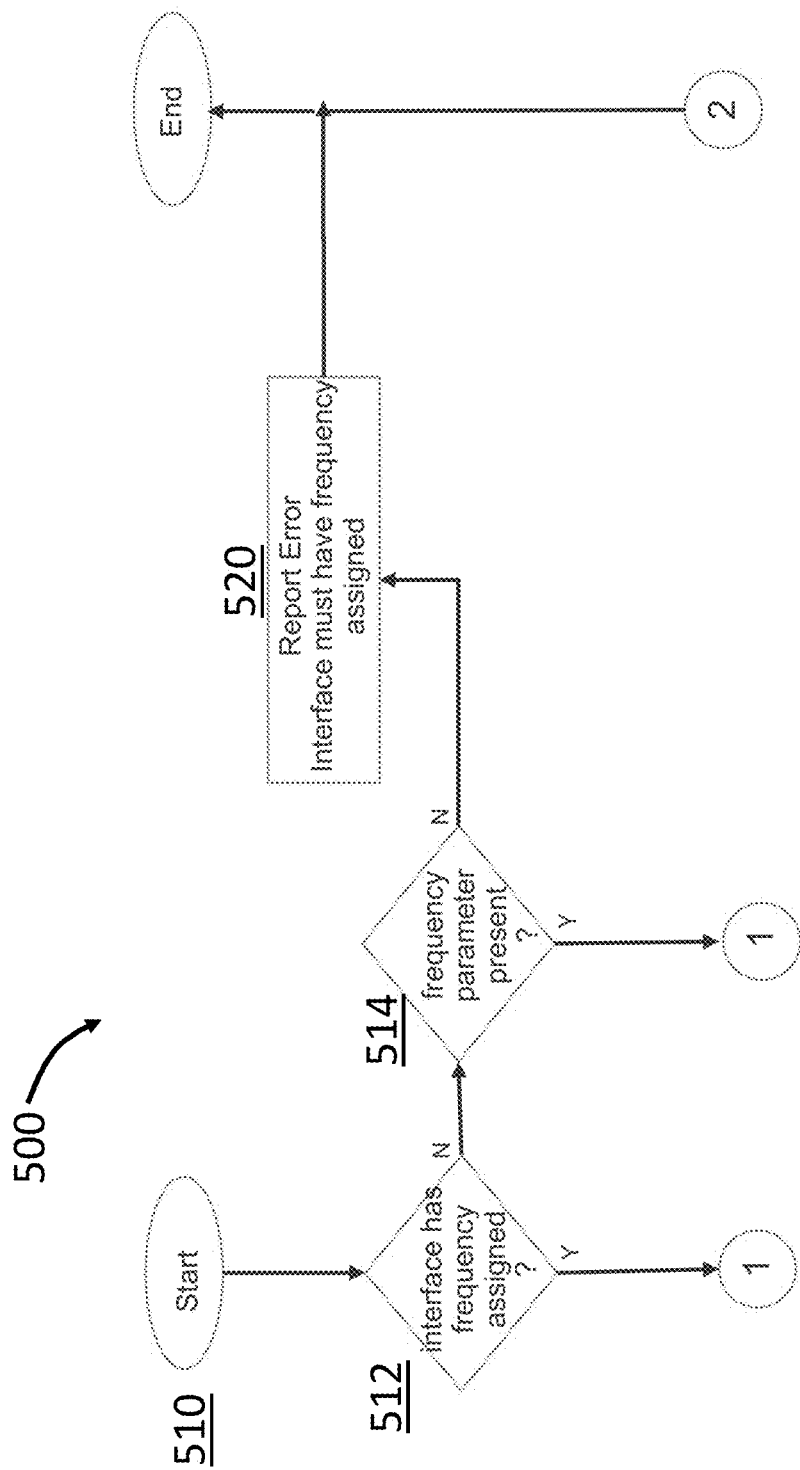
FIGS. 5A and 5B illustrate flowchart for a method of optical channel consistency test performed on a router, according to embodiments.
Figure 5B:
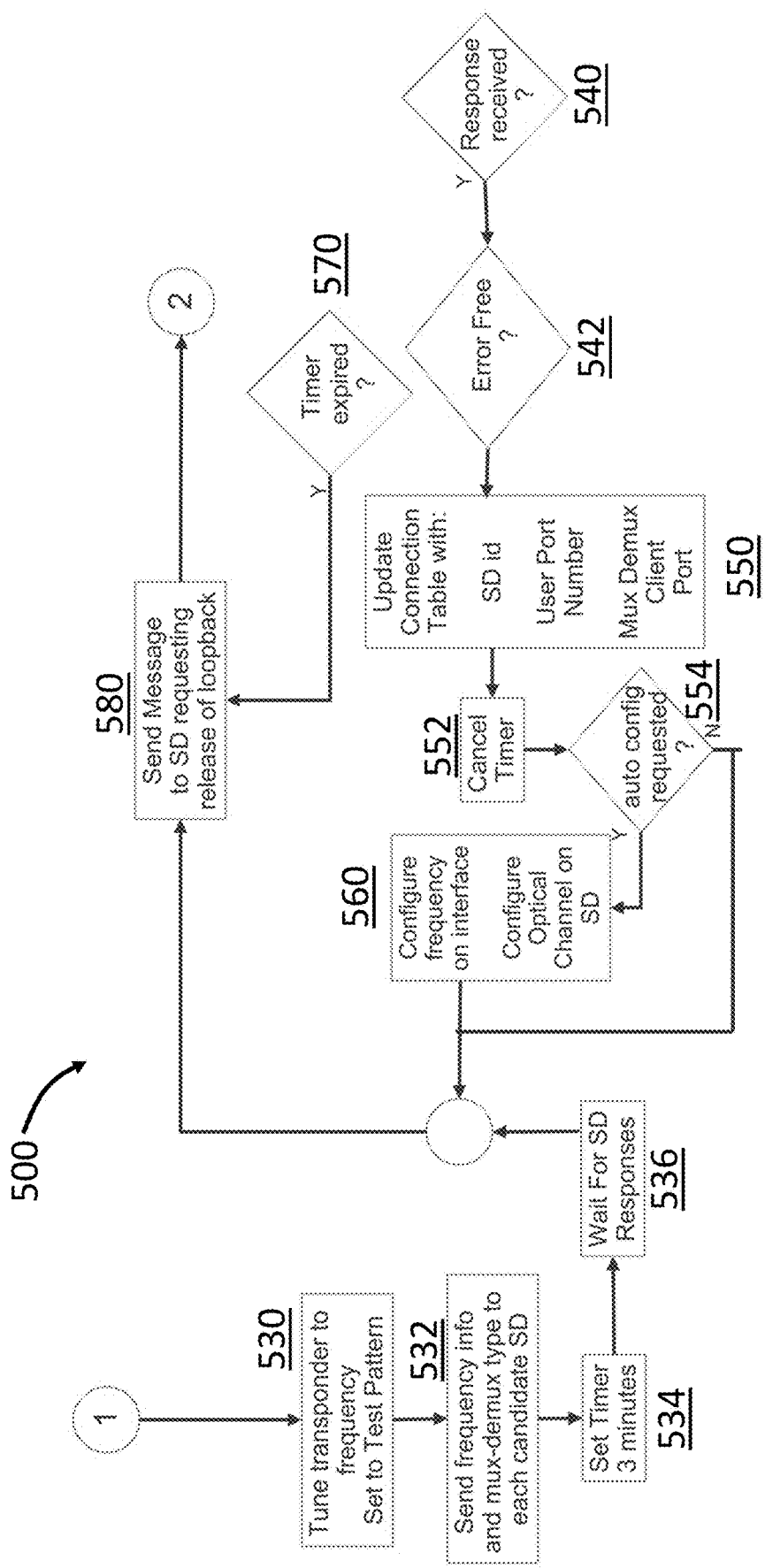

FIGS. 5A and 5B illustrates steps taken on a router in a method 500 of testing optical channel consistency. In some implementations, the method 500 can be performed manually. In some implementations, the method 500 can be automated using a command: test interface <interface-name> otn consistency central-frequency <frequency> [no configure]. In this command, the "interface" is the interface name of the transponder (also referred to as a transceiver, i.e. the combination of transmitter and receiver) on the router, and "central-frequency" is the frequency value of the optical signal to use when programming the transponder in THz.

The method 500 starts at 510 and proceeds to 512, where the presence of the frequency parameter is determined, i.e., checking if someone has configured manually which frequency shall be chosen. If the frequency parameter is present, the method 500 proceeds to 530 illustrated in FIG. 5B. Otherwise, the method 500 proceeds to 514, where the method 500 determines whether the interface (e.g., a transceiver module, such as a transceiver module on the left side of the router 312 shown in FIG. 3B) is assigned a frequency. If so, the method 500 again proceeds to 530. Otherwise, an error message is generated at 520 and the error message indicates that the interface must have frequency assigned.

At 530, the transponder on the ROADM is tuned to the assigned frequency if the transponder has an assigned frequency (from 512). If the transponder does not have an assigned frequency, then the transponder is tuned to the supplied frequency, which can be selected from a list of unused frequencies. In other words, if the transponder has no configured frequency, the transponder can pick one frequency (i.e., a supplied frequency) that is currently unused and run the connectivity check. If successful, the picked frequency is confirmed and then reserved for that transceiver at 514.

In addition, the trail trace identifier (TTI) is set on test pattern. A TTI is usually used to identify the optical signal from the source to the destination within the optical network. The TTI can contain an access point identifier(s) (API), which are used to specify the source, and a destination access point identifier(s) (DAPI). The APIs contain information regarding the country of origin, network operator, and administrative details.

At 532, an optical signal indicating the frequency information and mux-demux type is sent to each candidate ROADM. A timer is set at 534 and the router is then set to wait for ROADM to respond at 536. In some implementations, the timer can be set at about 3 minutes. In some other embodiments, the timer can be set at about 30 seconds to about 10 minutes (e.g., about 30 seconds, about 1 minute, about 2 minutes, about 3 minutes, about 5 minutes, or about 10 minutes, including any values and sub ranges in between).

At 540, the router checks whether any response is received from any ROADM. If so, the router also checks whether the received response has an error at 542. The method 500 the proceeds to 550, where the connection table is updated with identification information of the ROADM (e.g., based on the received response), user port number in the ROADM, and client port number in the Mux/Demux (e.g., see FIG. 3). The timer is then cancelled at 552.

At 554, the router checks whether automatic configuration is requested. If so, the method proceeds to 560, where the interface on the ROADM is configured and an optical channel on the ROADM is also configured. The method 500 then proceeds to 580, where the router sends a message to the ROADM to request release of loopback (i.e., the ROADM loopbacks signals to the router). As used herein, configuration can refer to the action in which the frequency is now reserved for that transponder. In other words the frequency is removed from the list of available frequencies and put into the configuration of the transceiver.

Figure 6:
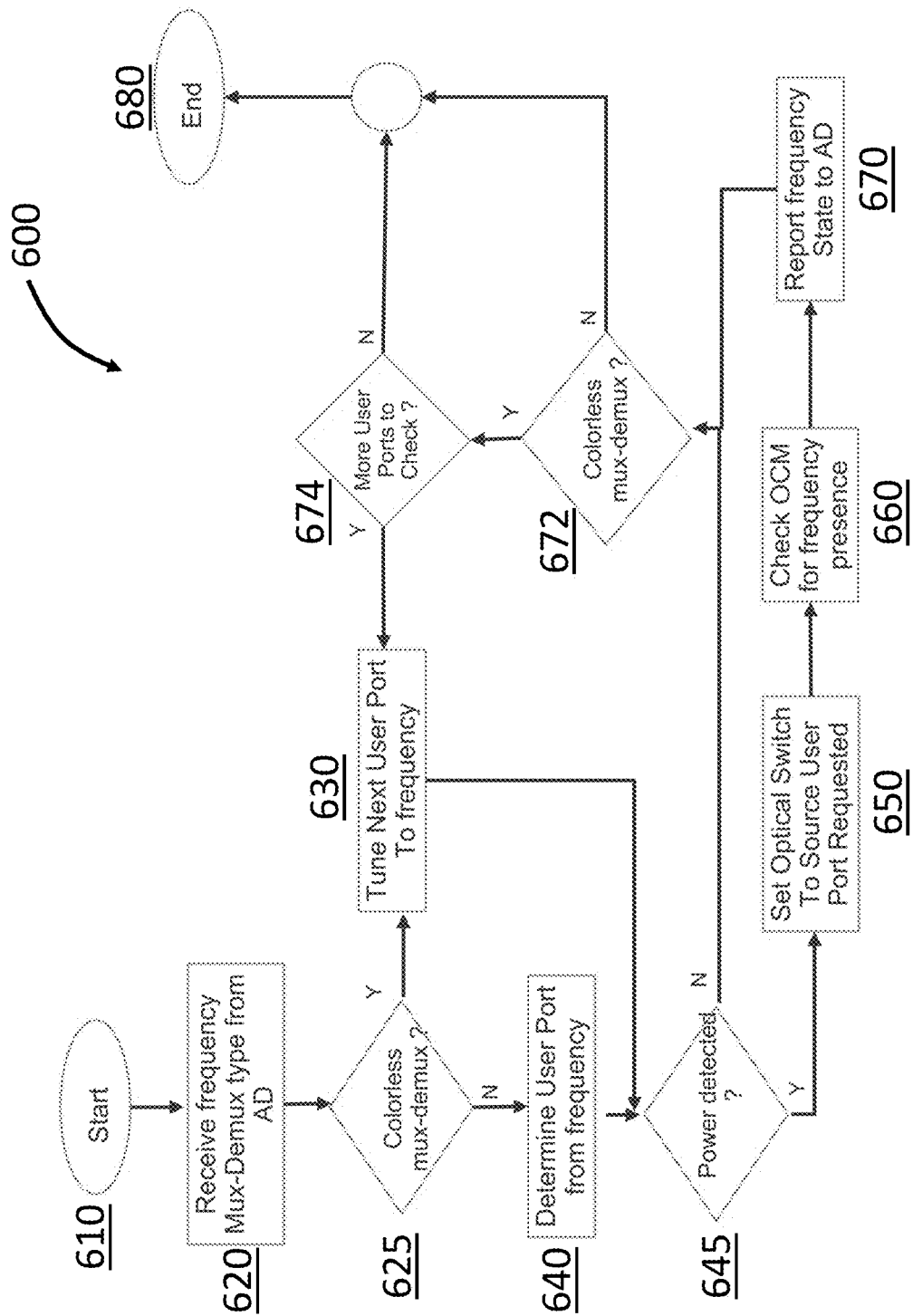
FIG. 6 illustrates flowchart for a method of optical channel consistency test steps performed on a ROADM, according to embodiments.

FIG. 6 illustrates a method 600 of optical channel consistency test taken on a ROADM, according to an embodiment. The method 600 starts at 610 and the moves to 620, where the ROADM receives an optical signal indicating frequency information and Mux/Demux type information from the router. The ROADM then checks whether the Mux/Demux is a colorless Mux/Demux at 625. If so, the ROADM tunes the next user port to the received frequency at 630. If not, the ROADM determines, at 640, the user port from the received frequency using, for example, an optical channel monitor (OCM).

After either 630 or 640, the method 600 determines whether any power is detected at the user port, at 645. If power is detected, an optical switch in the ROADM is set to source the requested user port (i.e., where power is detected), at 650. The ROADM also checks the OCM for frequency presence at 660 and reports the frequency state to the router at 670. The sourcing step can be illustrated with reference to FIG. 1. The apparatus in FIG. 1 includes ports 110*a* to 110*b* labeled U1 to U20, respectively. Assuming the spectral analyzer 155*a* detects some increase of power, the spectral analyzer then informs the OCM 150. Then the OCM 150 tunes its monitoring capability to identify and/or locate the corresponding interface (i.e., 110*a* in this case). During that time, none of the other 19 remaining interfaces is monitored.

If no power is detected at 645 (or after 670), the method 600 proceeds to 672, where the ROADM again checks the type of the Mux/Demux. If colorless Mux/Demux is used, the ROADM determines whether more user ports are to be checked at 674. If more user ports are to be checked, the method 600 proceeds back to 630. Otherwise, the method 600 ends at 680. If at 672, the ROADM determines that a fixed-color Mux/Demux is used, the method 600 directly proceeds to the end at 680.

At least three scenarios are possible in optical channel consistent test described above. In the first scenario, the router, the Mux/Demux, and the ROADM are connected correctly. More specifically, the router is connected to the correct client port on the Mux/Demux, and the Mux/Demux line port is connected to the correct ROADM. In this case, expected optical signals are looped back from the ROADM and received by the router.

For example, a user may intend to connect the router to Mux/Demux client port 95 and connect Mux/Demux line port to port U0 on a ROADM. And the router, the Mux/Demux, and the ROADM are indeed connected as intended. In this case, an example of optical consistency test on the router can be described as follows. First, a frequency of about 196.1 THz can be set on the router (e.g., et-7/1/0) and a topology table can include this frequency. A topology table can be, for example, a list of nodes describing for each connection for which wavelengths are already in use. This list can be constructed using communication channels and usually doesn't need a test pattern.

Then the TTI is set to test pattern (e.g., using command "Testing et-7/1/0 with frequency 196.1 THz"). The test then proceeds to find all ROADMs that do not have frequency 196.1 configured. The router then sends a message to all ROADMs in the ROADM list including "frequency=196.1 and fixed-color mux-demux type." A three-minute timer is set to wait for responses.

The test then proceeds to process the response from each ROADMs. The response may contain the following information: id=fpc 101 (i.e., ROADM ID), mux-demux client port=C95, SD user por=U0. The test then caries out TTIRx="Testing et-7/1/0 with frequency 196.1 THz" and checks bit errors. At this step, once it is clear that the frequency is available, the two user ports at the two ends (e.g., on the ROADM and the mux/demux) are connected and checked for bit-errors.

If this step passes, the topology table is filled with information received from the ROADM. Timer is then cancelled. The router then sends a message to the ROADM indicating that the test is complete. If automatic configuration is selected, the ROADM is set at 196.1 THz. The channel configuration is also sent to the ROADM with frequency at 196.1 THz and ROADM User Port=U0.

On the ROADM, the test can be described as follows. The ROADM first receives the message from the router, including the information: frequency=196.1, Mux/Demux type=fixed-color. The ROADM then translates the frequency (i.e., 196.1 THz) to Mux/Demux client port (i.e., C96) and starts a loop over user ports. If no power is present on the port being interrogated, the test continues to check other user ports. Otherwise, the ROADM sets the optical switch to direct User Port 0 and acquire spectral information from the OCM. If the frequency at 196.1 THz is present, the test passes and the ROADM sets loopback for frequency 196.1 THz on User Port 0. After the round finishes, the ROADM receives a message from the router indicating that the test is complete. The loopback can then be terminated. In some instances, auto-configuration is selected, and the ROADM receives a message from the router including a configuration request: frequency=196.1, User Port=0. In this case, the ROADM provisions the channel at 196.1 THz on port U0.

In the second scenario, the router is connected to the wrong Mux/Demux client port but the Mux/Demux line port is connected by an optical fiber to the correct ROADM. In this case, the router usually sees error indication from the ROADM.

For example, the user may intend to connect the router (e.g., et-7/1/0) to Mux/Demux client port 95 and connect Mux/Demux line port to port U1 on the ROADM. The actual connection, however, is that the router is connected to Mux/Demux client port 94 (incorrect connection) and the Mux/Demux line port is connected by an optical fiber to port U1 on the ROADM (correct connection).

In this case, an example of optical consistency test on the router can be described as follows. First, a user sets frequency on the router to be 196.1 THz and sets this frequency in the topology table to 196.1 THz. Then the user can set TTI to "Testing et-7/1/0 with frequency 196.1 THz" and find all ROADMs that do not have frequency 196.1 THz configured. The router also sends a message to all ROADMs including: frequency 196.1 THz and fixed-color mux-demux type. A 3 minutes timer is set to wait for responses. In this second scenario, the timer would expire. The test then carries out TTIRx="Testing et-7/1/0 with frequency 196.1 THz" which would fail. The router then updates topology table with "Test failed: No signal detected" and sends a message to ROADMs indicating that the test is complete.

On the ROADM, the test can be described as follows. The ROADM receives the message from the router, including the frequency information and the type of the Mux/Demux. The ROADM translates the frequency (196.1 THz) to Mux/Demux client port (i.e., C95) and starts the loop over user ports. For a given user port, if no power is detected, the ROADM checks next user port. If power is detected, the ROADM sets the optical switch to direct current User Port and acquire spectral information from the OCM. The ROADM then tests the presence of 196.1 THz but this test would fail in this second scenario. The ROADM moves to Next Port and loops over all User Ports until the Test Complete signal is received from the router. At this step, the ROADM stops looping User Ports.

In the third scenario, the router is connected to the correct Mux/Demux client port but the Mux/Demux line port is connected to the wrong ROADM. In this case, the router receives unexpected information from the loopback of the ROADM.

For example, a user may intend to connect the router to Mux/Demux client port 95 and connect Mux/Demux line port to port U1 on the ROADM (e.g., fpc 101). The actual connection is, however, that the router is connected by an optical fiber to Mux/Demux client port 95 (correct connection) and the Mux/Demux line port is connected to port U1 on the ROADM fpc 102 (wrong connection).

In this case, an example of optical consistency test on the router can be described as follows. First, a user sets frequency on et-7/1/0 to 196.1 THz and sets this frequency in the topology table to 196.1 THz. Then the user can set TTI to "Testing et-7/1/0 with frequency 196.1 THz" and the router can find all ROADMs that do not have frequency 196.1 THz configured. The router then sends a message to all ROADMs, including: frequency=196.1 THz and fixed-color mux-demux type. A 3 minute timer is set to wait for responses.

The router then processes responses from ROADMs including: ROADM id=fpc 102, Mux/Demux client port=C95, and SD user port=U1. The router then tests for TTIRx="Testing fpc 7 with frequency 196.1 THz" and tests for bit errors. If these two steps pass, the router fills in otn-connection table with information received from the ROADM(s). This otn-connection table is created at each node. Accordingly, each node "knows" (or has information on) which end points are connected at which frequency and through which ROADM. The timer is cancelled and the router sends a message to the ROADM(s) indicating that the test is complete. In some embodiments, the automatic configuration is selected and the topology status is not equal to "Mismatch." The router then sets frequency in fpc 7 configuration to 196.1 THz and sends configuration to ROADM including: frequency=196.1, ROADM User Port=U1.

On the ROADM, the test can be described as follows. The ROADM receives the message from the router including the frequency information and the type of the Mux/Demux. The ROADM also translates frequency (i.e., 196.1 THz) to Mux/Demux client port (i.e., C95) and starts a loop over user ports. For a given user port, if no power detected, the ROADM continues the loop. If power is detected, the ROADM sets the optical switch to direct User Port 1 and acquires spectral information from the OCM. The ROADM also tests for the presence of the frequency 196.1 THz. This step would pass in this third scenario. The ROADM then sets loopback for frequency 196.1 THz on User Port 1 and receives a message from the router that the test is complete. The ROADM then removes the loopback. In some instances, the auto-configuration mode is selected and the ROADM receives the message from the router including a configuration request: frequency=196.1 THz, User Port=1. The ROADM then provisions channel (196.1 THz) on port U1.

In the event that the optical channel consistency test fails, an optical channel sweep test can be performed to find user port on the ROADM is connected to the router. This test is only performed for ROADM user ports that are connected to fixed-color Mux/Demux, but not when connected to a colorless Mux/Demux. This is because for colorless Mux/Demux, the optical channel consistency check is itself a sweep test where the sweep occurs on the ROADM. For this test the sweep occurs on the router. For ROADM user ports that have fixed-color Mux/Demux, this test can cycle through the available wavelengths on the ROADMs to see which client port of the Mux/Demux the router is connected to.

Figure 7:
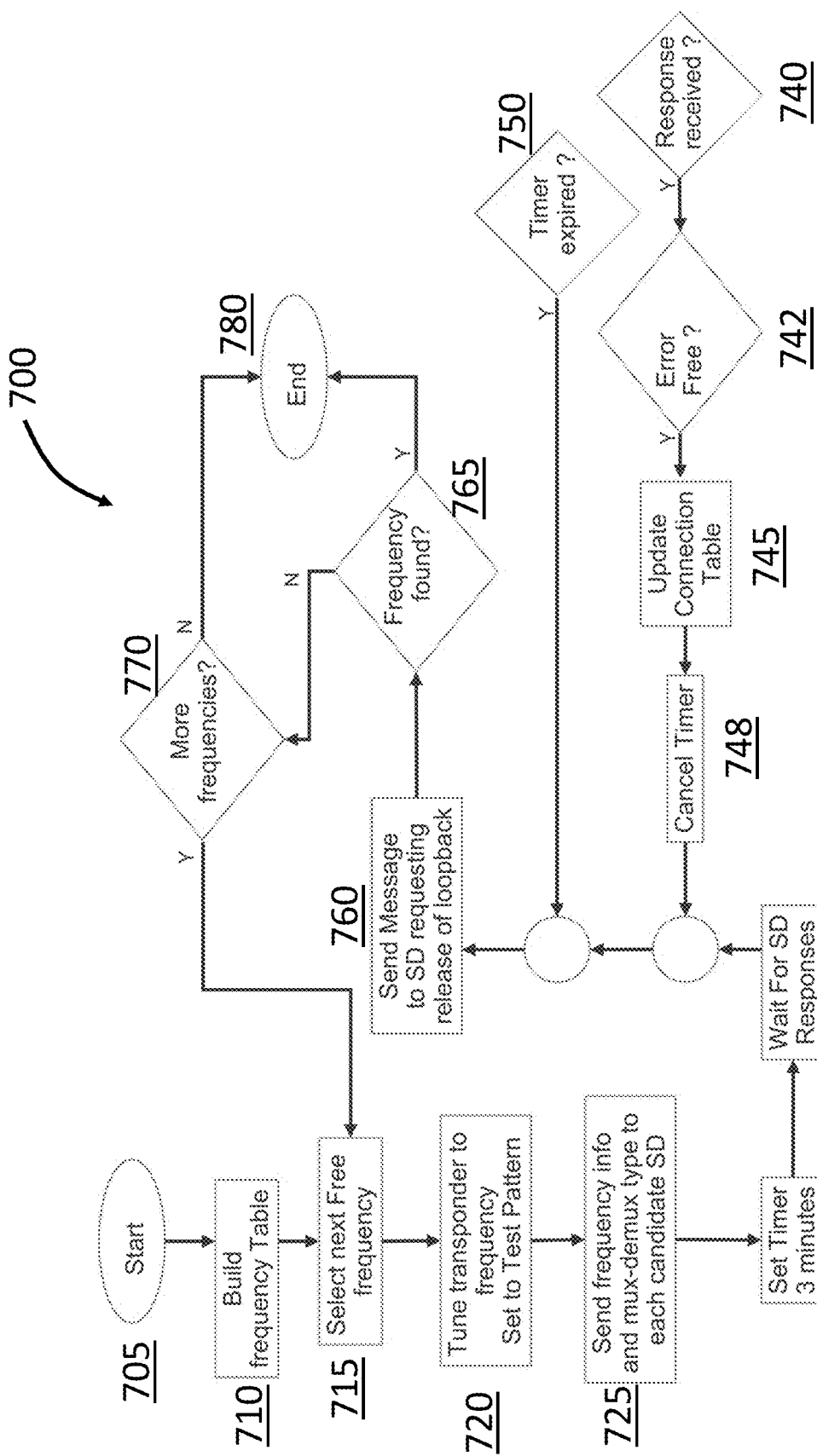
FIG. 7 illustrates a flowchart for a method of optical channel sweep test performed on a router, according to embodiments.

FIG. 7 illustrates a method 700 of optical channel sweep test performed on a router, according to an embodiment. The method 700 starts at 705 and proceeds to build a frequency table at 710. The frequency table can include all unused frequencies for all ROADMs. Over the frequency table, the router selects next free frequency at 715 and tunes the transponder on the router to the selected frequency at 720. The router also sets the TTI to the test pattern at this point.

At 725, the router sends the frequency information and the type of the Mux/Demux to each candidate ROADM. A 3-minute timer is set at 730 to wait for responses at 735. At 740, the router determines whether any response is received from the ROADM and further determines whether the received response is error free at 742. At 745, the router updates the connection table, followed by cancelling the timer at 748.

After 748, or after the expiration of the timer at 750, the method 700 then proceeds to 760, where the router sends a message to the ROADM requesting the release of loopback. If the supplied frequency is found at 765, the method 700 stops at 780. Otherwise, the router determines whether more frequencies are to be checked at 770. If there are more free frequencies, the method 700 moves to 715 and start another round of sweep test. If there is no more free frequency, the method 700 ends at 780.

Figure 8:
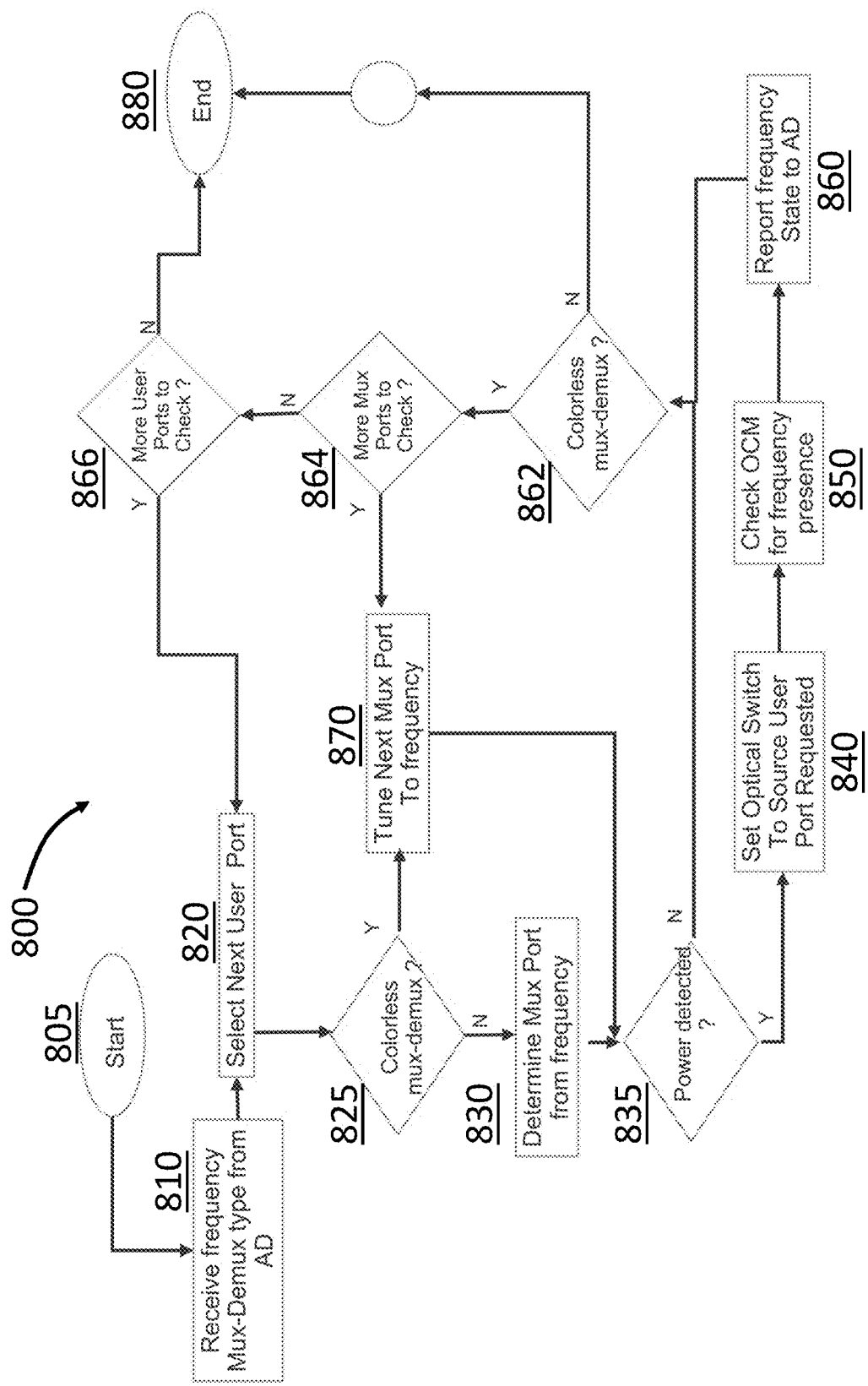
FIG. 8 illustrates a flowchart for a method of optical channel sweep test performed on a ROADM, according to embodiments.

FIG. 8 illustrates a method 800 of optical channel sweep test performed on a ROADM, according to embodiments. The method 800 starts at 805 and the ROADM receives a signal indicating the frequency information and the type of the Mux/Demux from the router at 810. The ROADM then selects next user port at 820. At 825, the ROADM determines whether colorless Mux/Demux is used. If so, the ROADM tunes the Mux/Demux port to the received frequency. If a fixed-color Mux/Demux is used, the method moves to 830, where the ROADM determines the Mux/Demux port from the received frequency.

The ROADM then detects whether any power is detected for the selected user port at 835. If power is detected, the ROADM sets the optical switch to source the selected user port at 840 and also checks the OCM for frequency presence at 850. The ROADM also reports the frequency state to the router at 860. After 860, or in the event that no power is detected at 835, the method proceeds to 862, where the ROADM determines again the type of Mux/Demux.

If the Mux/Demux is colorless, the ROADM checks whether more Mux/Demux ports are to be checked at 864. If more Mux/Demux ports are to be checked, the method proceeds to 870 and initiate another round of sweep test. If, however, there is no more Mux/Demux port to check, the method proceed to 866, where the ROADM checks whether there are more user ports to check. If so, the method 800 moves back to 820 to initiate another round of sweep test. If there is no more user port to check, the method ends at 880.

In addition to the optical channel consistency test and the optical channel sweep test, an optical channel discovery can also be performed to determine which router is connected to which port at which ROADM. In this test, a "Master Router" can control the execution of the test. The "Master Router" assigns the frequency (also referred to as pilot frequency). The test is performed to all transponders on all routers and includes all ROADMs. The optical channel consistency test described above can also be performed one by one.

In some implementations, the optical channel discovery test can be performed automatically using, for example, a processor. In some implementations, the optical channel discovery test can be performed manually. In automatic operation, the optical channel discovery starts upon plug-in of a pluggable ROADM. In this operation, the router programs a pilot frequency on the router and all ROADMs. The ROADM monitors all unconfigured user ports. Upon reception of power, a loopback of pilot frequency is set up. The router port also checks quality of connection and assigns frequency.

Figure 9:
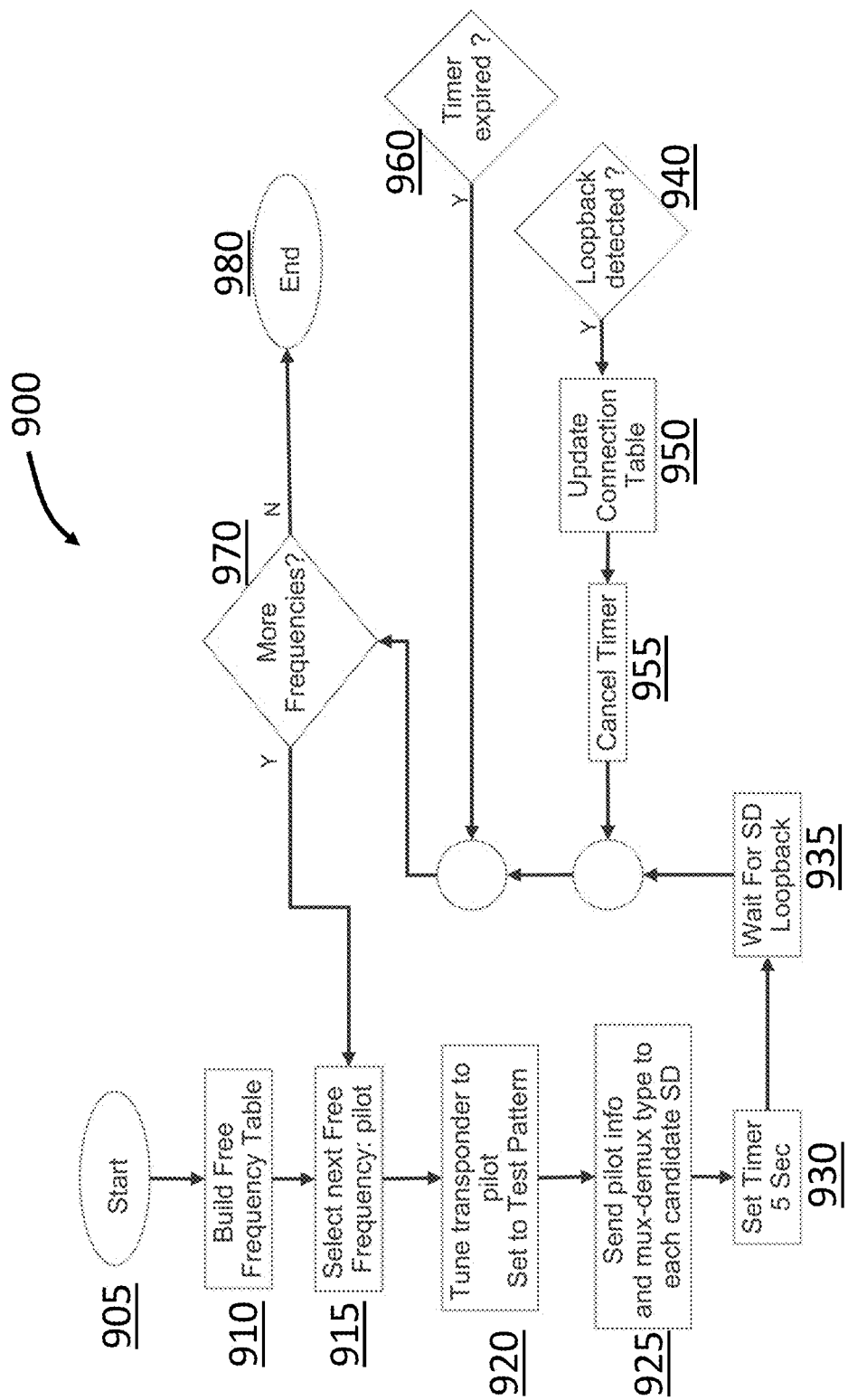
FIG. 9 illustrates a flowchart for a method of optical channel discovery performed on a router, according to embodiments.

FIG. 9 illustrates a method 900 of optical channel discovery performed on a router, according to embodiments. The method 900 starts at 905 and moves to 910, where the router builds a table including all free frequencies. The router then selects next free frequency (referred to as pilot frequency) at 915 and tunes the transponder to the pilot frequency at 920. The router also sets the TTI to test pattern at 920. A timer is set at 930 to wait for responses at 935.

At 940, the router checks whether any signal is received from loopback within the preset time duration on the timer. The router also updates the connection table based on received loopback at 950 and cancels the timer at 955. Alternatively, the router may not receive any signal from the loopback in ROADMs and the timer expires at 960. After either 960 or 955, the method proceeds to 970, where the router checks whether there is more free frequency to run the test. If so, the method 900 returns to 915 and initiates another round of channel discovery. If there is no more free frequency, the method 900 ends at 980.

Figure 10:
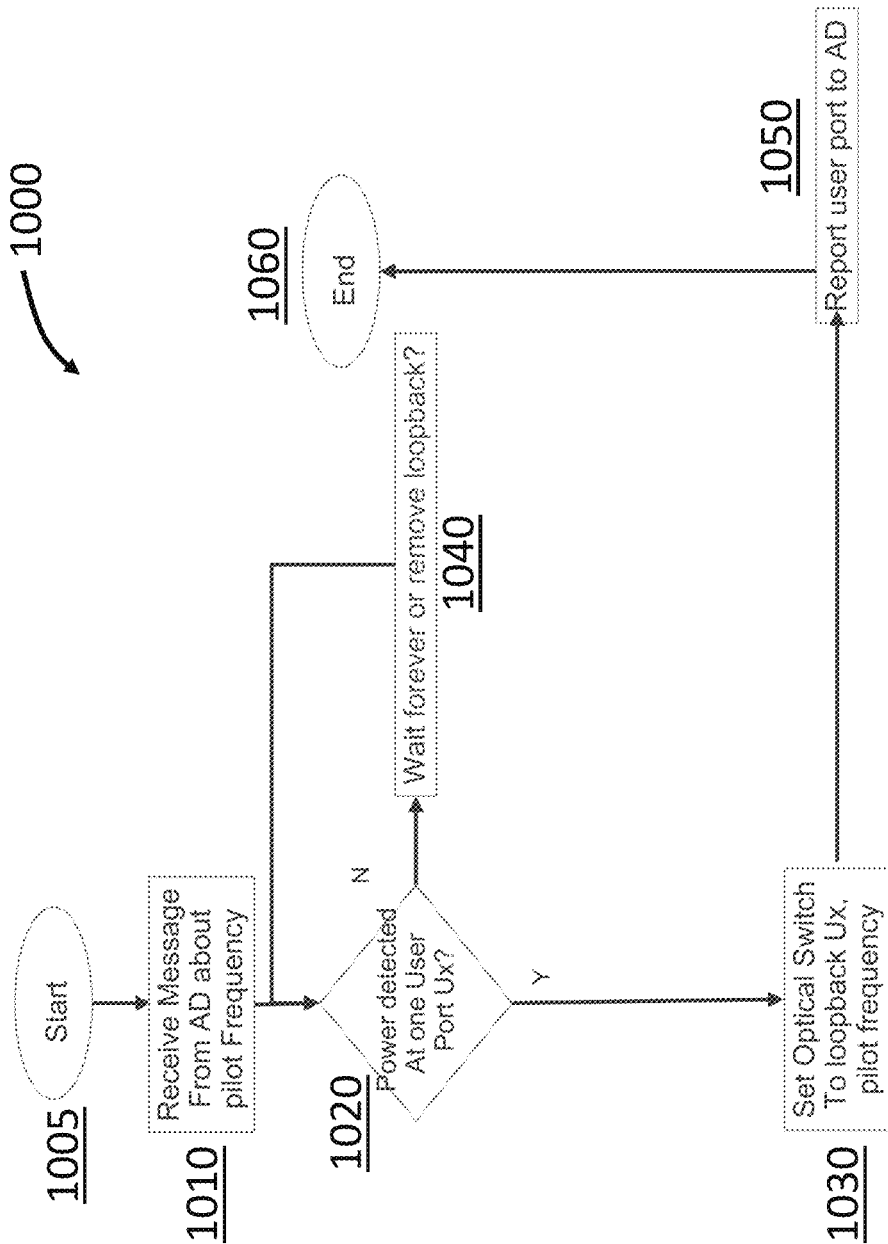
FIG. 10 illustrates a flowchart for a method of optical channel discovery steps performed on a ROADM in, according to embodiments.

FIG. 10 illustrates a method 1000 of optical channel discovery performed on a ROADM, according to an embodiment. The method 1000 starts at 1005 and includes receiving a message from the router including the pilot frequency information at 1110. At 1120, the ROADM detect power at one user port (i.e., Ux). If power is detected (or above a threshold), the ROADM sets the optical switch to loopback the user port and tests for the presence of the pilot frequency, at 1030. The ROADM also reports the user port information to the router at 1050. The method 1000 then ends at 1060. In the event that no power is detected at the user port at 1020, the method moves to 1040, where the ROADM either removes the loopback or waits forever. As described above, the ROADM operates in an idle mode (also referred to as a monitoring mode) until it detects some power change at monitoring points, such as 155a shown in FIG. 1. As soon as a power change is detected the discovery procedure is invoked.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a reconfigurable optical add/drop multiplexer (ROADM) having:
   an input port configured to receive a first optical signal from a device;
   a first spectral analyzer, operatively coupled to the input port, configured to acquire first spectral information of the first optical signal;
   a user port, operatively coupled to the input port, configured to receive a second optical signal converted from the first optical signal;
   a second spectral analyzer, operatively coupled to the user port, configured to acquire second spectral information of the second optical signal; and
   an optical channel monitor (OCM), operatively coupled to the first spectral analyzer and the second spectral analyzer, configured to:
   receive the first spectral information from the first spectral analyzer; locate
   the user port based at least in part on the first spectral information;
   receive the second spectral information from the second spectral analyzer; and
   transmit the second spectral information to the device.

2. The apparatus of claim 1, wherein the device includes a router.

3. The apparatus of claim 1, wherein the OCM is further configured to:
   locate the user port based at least in part on the second spectral information.

4. The apparatus of claim 1, wherein the second spectral analyzer is further configured to acquire power information on the user port.

5. The apparatus of claim 1, further comprising an optical amplifier operatively coupled to the second spectral analyzer, the optical amplifier configured to amplify the second optical signal.

6. The apparatus of claim 1, further comprising a wavelength selective switch (WSS), in optical communication with the input port, to convert the first optical signal into the second optical signal.

7. The apparatus of claim 1, wherein the first optical signal includes a plurality of test signals output from a colored multiplexer/demultiplexer, each test signal from the plurality of test signals having a distinct wavelength.

8. The apparatus of claim 1, wherein the first optical signal includes an output signal from a colorless multiplexer/demultiplexer.

9. A method, comprising:
   receiving, via an input port of a reconfigurable optical add/drop multiplexer (ROADM), a first optical signal from a device;
   acquiring, via a first spectral analyzer, first spectral information of the first optical signal;
   receiving, via a user port, a second optical signal converted from the first optical signal;
   acquiring, via a second spectral analyzer, second spectral information of the second optical signal;
   receiving, at an optical channel monitor (OCM), the first spectral information from the first spectral analyzer;
   locating the user port based at least in part on the received first spectral information;
   receiving, at the OCM, the second spectral information from the second spectral analyzer; and
   transmitting the second spectral information to the device.

10. The method of claim 9, wherein receiving the first optical signal includes receiving the first optical signal from a router or a switch.

11. The method of claim 9, wherein locating the user port includes locating the user port based at least in part on the second spectral information.

12. The method of claim 9, further comprising acquiring, via the second spectral analyzer, power information on the user port.

13. The method of claim 9, further comprising amplifying the second optical signal using an optical amplifier.

14. The method of claim 9, wherein the second optical signal is converted from the first optical signal to the second optical signal using a wavelength selective switch (WSS).

15. The method of claim 9, wherein the first optical signal includes a plurality of test signals output from a colored multiplexer/demultiplexer, each test signal from the plurality of test signals having a distinct wavelength.

16. The method of claim 9, wherein the first optical signal includes an output signal from a colorless multiplexer/demultiplexer.

17. The method of claim 9, further comprising:
    setting a timer with a predetermined expiration time; and
    in response to no signal being received within the predetermined expiration time, generating an error message representing an erroneous connection between the device and the input port.

18. The method of claim 9, further comprising:
    provisioning an optical channel on the user port based at least in part on the first spectral information and the second spectral information.

19. An apparatus, comprising:
    a reconfigurable optical add/drop multiplexer (ROADM) having:
    an input port to receive a first optical signal from a device;
    a wavelength selective switch (WSS), in optical communication with the input port, to convert the first optical signal into a second optical signal;
    a loopback, in optical communication with the WSS, to transmit the second optical signal to the device;
    a timer configured to count a predetermined expiration time; and
    a transponder operatively coupled to the timer and the input port, the transponder configured to generate an error message representing an erroneous connection between the device and the input port in response to no signal being received by the device within the predetermined expiration time.

20. The apparatus of claim 19, wherein the device includes a router.

* * * * *